United States Patent
Birch

(12) 
(10) Patent No.: US 11,949,804 B2
(45) Date of Patent: Apr. 2, 2024

(54) VOICE COMMUNICATION NETWORK DEFENSE SYSTEM

(71) Applicant: BANK OF AMERICA CORPORATION, Charlotte, NC (US)

(72) Inventor: Christopher Daniel Birch, Tega Cay, SC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 359 days.

(21) Appl. No.: 17/198,616

(22) Filed: Mar. 11, 2021

(65) Prior Publication Data
US 2022/0294890 A1 Sep. 15, 2022

(51) Int. Cl.
*H04M 1/663* (2006.01)
*G06N 20/00* (2019.01)
*H04M 3/22* (2006.01)

(52) U.S. Cl.
CPC .......... *H04M 1/663* (2013.01); *G06N 20/00* (2019.01); *H04M 3/2281* (2013.01)

(58) Field of Classification Search
CPC .. H04M 3/2281; H04M 3/38; H04M 2201/41; H04M 3/42221; H04M 1/67; H04M 2203/6054; H04M 3/2218; H04M 3/382; H04M 3/385; H04M 2203/558; H04M 3/42025; H04M 1/72457; H04M 2201/42; H04M 2203/305; H04M 3/20; H04M 3/436; H04M 2201/40; H04M 2203/6027; H04M 1/673; H04M 1/677
See application file for complete search history.

(56) References Cited

U.S. PATENT DOCUMENTS

| | | | |
|---|---|---|---|
| 6,411,601 B1 | 6/2002 | Shaffer et al. | |
| 6,515,984 B1 | 2/2003 | Arimilli et al. | |
| 6,549,587 B1 | 4/2003 | Li | |
| 6,704,308 B2 | 3/2004 | Sanders et al. | |
| 6,731,625 B1 | 5/2004 | Eastep et al. | |
| 6,775,265 B1 | 8/2004 | Oran | |
| 6,882,711 B1 | 4/2005 | Nicol | |
| 7,423,983 B1 | 9/2008 | Tackin et al. | |
| 9,621,579 B2 | 4/2017 | Casaburi et al. | |
| 10,554,821 B1 | 2/2020 | Koster | |
| 10,778,840 B1* | 9/2020 | Woirhaye | H04L 51/212 |
| 10,798,241 B1* | 10/2020 | Quilici | H04M 3/42059 |
| 2007/0025265 A1 | 2/2007 | Porras et al. | |

(Continued)

*Primary Examiner* — Golam Sorowar
(74) *Attorney, Agent, or Firm* — Moore & Van Allen PLLC; James C. Edwards

(57) ABSTRACT

Voice communication network defense security which allows for managing and/or preventing voice calls based on which telecommunication carrier provided the calling number. By managing calls based on telecommunication carrier as opposed to the calling number, the present invention seeks to prevent intrusion by wrongdoers who may otherwise be in possession with an unlimited supply of calling numbers. Further, by implementing the security measures at the voice communication network perimeter, voice calls can be managed and/or prevented/block in real-time while the call is in a pre-answer state. As a result, the present invention provides the capability to prevent/block wrongdoers from accessing the intra-voice communication network or, at a minimum ensures that potential wrongdoers are properly vetted through an investigative process.

14 Claims, 4 Drawing Sheets

(56) References Cited

U.S. PATENT DOCUMENTS

| | | |
|---|---|---|
| 2007/0060097 A1 | 3/2007 | Edge et al. |
| 2007/0140262 A1 | 6/2007 | Wang |
| 2011/0080302 A1 | 4/2011 | Muthaiah et al. |
| 2013/0247194 A1 | 9/2013 | Jha et al. |
| 2022/0124195 A1* | 4/2022 | Lu .................... H04M 3/42042 |

* cited by examiner

VOICE COMMUNICATION NETWORK DEFENSE SYSTEM

FIELD OF THE INVENTION

The present invention relates to security in voice communication networks and, more specifically, determining which call disposition action to take based on the reputation of the telecommunication carrier associated with the voice call.

BACKGROUND

Typically, wrongdoers, such as individuals attempting to wrongfully acquire personal data of others, will conduct voice calls using spoofing techniques. Spoofing techniques allow for the caller/wrongdoer to deliberately communicate false information to change the caller ID (i.e., phone number) that is otherwise provided to the called party. As a result, the called party can not prevent such calls by merely blocking certain caller IDs, since in spoofed instances the caller IDs are not reflective of the true calling party.

However, recently government agencies have implemented policies and taken other actions which serve to prevent the use of spoofing. As a result of the inability to spoof calls, the wrongdoers are left with the option of acquiring a large volume of valid numbers from telecommunication carriers. These numbers are considered by the wrongdoer as "throw away" numbers, since once they are blocked by a calling party, the wrongdoer can just use another one of their assigned numbers.

Therefore, a need exists to be able to allow for voice calls to be properly dispositioned (i.e., accepted, blocked, routed to an investigative entity or the like) by means other than the number itself. The desired systems, methods and the like should provide for real-time dispositioning of the voice call while the call is in a pre-answer state, such that, calls that are likely being made by wrongdoers are prevented from gaining access to the voice communication network, or at the least, undergone a heightened level of scrutiny/investigation.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a voice communication network security which allows for managing and/or preventing voice calls based on which telecommunication carrier provided the calling number.

As discussed previously, wrongdoers may resort to acquiring a large volume of valid numbers as a means of carrying out their nefarious actions, e.g., impersonating others in attempt to acquire personal data from the called entity. The large volume of numbers allows for the user to move on to a different number once a number is blocked by the called entity. Typically, trustworthy telecommunication carriers have security procedures in place to prevent users from acquiring a large volume of numbers. However, other telecommunications carriers, may be unconcerned with implementing such security procedures and allow users to acquire as many numbers as they desire. Over time, telecommunication carriers gain a reputation along a continuum that varies from highly trustworthy to highly suspect. The present invention leverages such carrier reputation data in determining how a voice call is dispositioned. In this regard, voice calls associated with telecommunication carriers having a highly trustworthy reputation are accepted, voice calls associated with telecommunication carriers having a highly suspect reputation are block, and voice calls associated with telecommunication carriers having a reputation somewhere else along the continuum may be routed to an investigative entity or the like.

The present invention is implemented at the voice communication network perimeter (e.g., in a firewall-like manner or the like), such that voice calls can be managed and/or prevented/block in real-time while the call is in a pre-answer state. As a result, the present invention provides the capability to prevent/block wrongdoers from accessing the intra-voice communication network or, at a minimum ensures that potential wrongdoers are properly vetted through an investigative process.

Specifically, the invention relies on determining or otherwise obtaining a repository of reputational indicators, otherwise referred to as scores or ratings, for each known telecommunication carrier. As voices calls are received the invention determines which telecommunication carrier is associated with the number and, in response to determining that a reputation indicator exists for the telecommunication carrier within the repository, determines a disposition action (e.g., accept, block, route to investigative entity) or the like based on the reputation indicator and, subsequently dispositions the call in accordance with the determined action. As a result, voice calls are managed and/or prevented based, not on the calling number, but rather on the reputation of the telecommunication carrier that issued the calling number.

A system for real-time network defense in a voice communication network defines first embodiments of the invention. The system includes a first computing platform having a first memory and at least one first processing device in communication with the first memory. The first memory stores a telecommunication carrier reputation indicator sub-system, which is executable by the first processing device(s). The subsystem is configured to obtain and store a reputation indicator for each of a plurality of telecommunication carriers.

The system additionally includes a second computing platform having a second memory and at least one second processing device in communication with the second memory. The second memory stores a voice call management subsystem, which is executable by the second processing device(s). The voice call management subsystem is configured to receive a voice call from a calling telecommunication number. Further, in real-time while the voice call is in a pre-answer state, voice call management subsystem, (i) identify a telecommunication carrier based on the calling telecommunication number, (ii) determine whether a reputation indicator for the telecommunication carrier exists in the telecommunication carrier reputation indicator sub-system, (iii) in response to determining that the reputation indicator for the telecommunication carrier exists in the sub-system, determine a disposition action for the voice call based on the reputation indicator for the telecommunication carrier, and (iv) disposition the voice call in accordance with the determined disposition action.

In specific embodiments of the system, the disposition action consists of one of (i) accepting the voice call, (ii) blocking the voice call, and (iii) routing the voice call to an investigative entity. In related embodiments of the system, the voice call management subsystem is further configured to determine the disposition action for the voice call by comparing the reputation indicator of the telecommunication carrier to one or more thresholds that are each associated with one of (i) accepting the voice call, (ii) blocking the voice call, and (iii) routing the voice call to an investigative entity.

In further specific embodiments of the system, the voice call management subsystem is further configured to store, in a voice call disposition repository, at least one of (i) the disposition action for the voice call, and (ii) a result of routing the voice call to the investigative entity. In such embodiments of the system, the voice call management subsystem may be further configured to implement machine-learning techniques to set values for the one or more thresholds based at least on one or more of (i) disposition actions of previous voice call and (ii) results of routing previous calls to the investigative entity.

In other specific embodiments of the system, the voice call management subsystem is further configured to identify the telecommunication carrier based on the calling telecommunication number by accessing a lookup service that matches telecommunication numbers to telecommunication carriers.

In still further specific embodiments of the system, the voice call management subsystem is further configured to, in response to determining that the reputation indicator for the telecommunication carrier does not exist in the telecommunication carrier reputation indicator sub-system, route the voice call to an investigative entity.

Moreover, in additional specific embodiments of the system, the telecommunication carrier reputation indicator sub-system is further configured to determine the reputation indicator for the plurality of telecommunication carriers by conducting at least one of public sector data searches and private sector data searches to acquire data indicative of the telecommunication carriers reputation for assigning telecommunication numbers to wrongdoers. In such embodiments of the system, the telecommunication carrier reputation indicator sub-system may be further configured to determine the reputation indicator for the plurality of telecommunication carriers based on (i) the data indicative of the telecommunication carriers reputation for assigning telecommunication numbers to wrongdoers, and (ii) data associated with results of previously dispositioned voice calls.

A computer-implemented method for real-time network defense in a voice communciation network, defines second embodiments of the invention. The method is implemented by one or more computing processor devices. The method includes determining and storing, in computing memory, a reputation indicator for each of a plurality of telecommunication carriers. The method further includes receiving a voice call from a calling telecommunication number. The method further includes performing the following in real-time while the voice call is in a pre-answer state (i) identifying a telecommunication carrier based on the calling telecommunication number, (ii) determining whether a reputation indicator for the telecommunication carrier exists in the computing memory, (iii) in response to determining that the reputation indicator for the telecommunication carrier exists in the computing memory, determining a disposition action for the voice call based on the reputation indicator for the telecommunication carrier; and (iv) dispositioning the voice call in accordance with the determined disposition action.

In specific embodiments of the computer-implemented method, the disposition action comprises one of (i) accepting the voice call, (ii) blocking the voice call, and (iii) routing the voice call to an investigative entity. In related embodiments of the computer-implemented method, determining the disposition action for the voice call further includes comparing the reputation indicator of the telecommunication carrier to one or more thresholds that are each associated with one of (i) accepting the voice call, (ii) blocking the voice call, and (iii) routing the voice call to an investigative entity.

In other specific embodiments the computer-implemented method further includes storing, in a voice call disposition repository, at least one of (i) the disposition action for the voice call, and (ii) a result of routing the voice call to the investigative entity. In related embodiments the computer-implemented method further includes implementing machine-learning techniques to set values for the one or more thresholds one or more of (i) disposition actions of previous voice call and (ii) results of routing previous calls to the investigative entity.

In other specific embodiments the computer-implemented method includes, in response to determining that the reputation indicator for the telecommunication carrier does not exist in the computing memory, routing the voice call to an investigative entity.

A computer program product including a non-transitory computer-readable medium defines third embodiments of the invention. the computer-readable medium includes a first set of codes for causing a computer to obtain and store, in computing memory, a reputation indicator for each of a plurality of telecommunication carriers. In addition, the computer-readable medium includes a second set of codes for causing a computer to, in response to receiving a voice call from a calling telecommunication number and in real-time while the voice call is in a pre-answer state (i) identify a telecommunication carrier based on the calling telecommunication number, (ii) determine whether a reputation indicator for the telecommunication carrier exists in the computing memory, (iii) in response to determining that the reputation indicator for the telecommunication carrier exists in the computing memory, determine a disposition action for the voice call based on the reputation indicator for the telecommunication carrier, and (iv) disposition the voice call in accordance with the determined disposition action.

In specific embodiments of the computer program product, the disposition action comprises one of (a) accepting the voice call, (b) blocking the voice call, and (c) routing the voice call to an investigative entity. In related embodiments of the computer program product, the second set of codes are further configured to cause the computer to (iii) determine the disposition action for the voice call further by comparing the reputation indicator of the telecommunication carrier to one or more thresholds, wherein the one or more thresholds are each associated with one of (a) accepting the voice call, (b) blocking the voice call, and (c) routing the voice call to an investigative entity In other specific embodiments of the computer program product, the computer readable medium further includes a third set of codes for causing a computer to store, in a voice call disposition repository, at least one of (i) the disposition action for the voice call, and (ii) a result of routing the voice call to the investigative entity.

In still further specific embodiments of the computer program product, the second set of codes is further configured to cause the computer to (v) in response to determining that the reputation indicator for the telecommunication carrier does not exist in the computing memory, route the voice call to an investigative entity.

Thus, systems, apparatus, methods, and computer program products herein described in detail below provide a voice communication network security which allows for managing and/or preventing voice calls based on which telecommunication carrier provided the calling number. As a result of managing voice calls based on the telecommunication carrier, as opposed to the calling number, the present invention seeks to address the problem of wrongdoers being in possession of a high number of "throw away" numbers. Further, by implementing the invention at the voice communication network perimeter, voice calls can be managed and/or prevented/block in real-time while the call is in a pre-answer state. As a result, the present invention provides the capability to prevent/block wrongdoers from accessing the intra-voice communication network or, at a minimum ensures that potential wrongdoers are properly vetted through an investigative process.

BRIEF DESCRIPTION OF THE DRAWINGS

Figure 1:
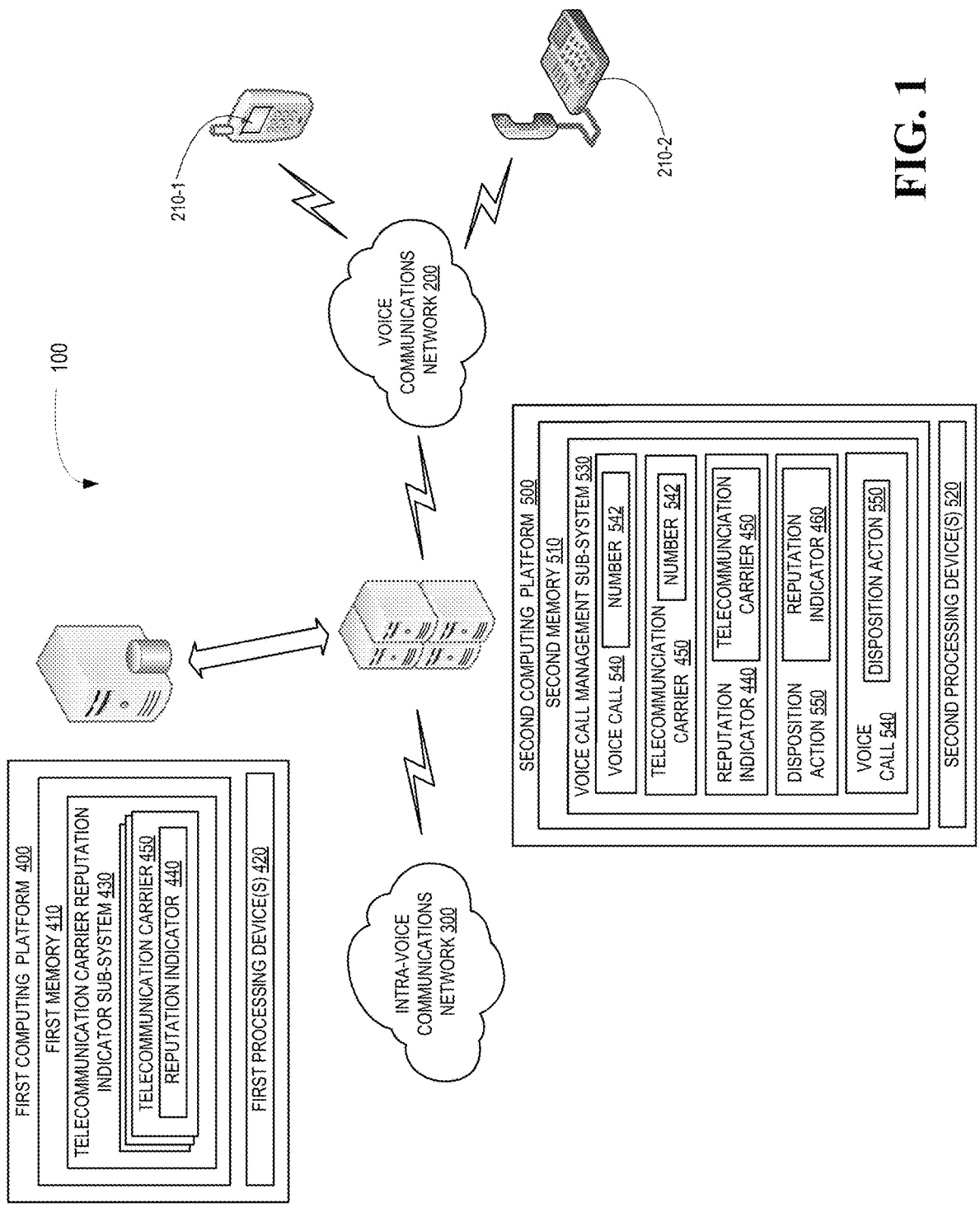
Figure 2:
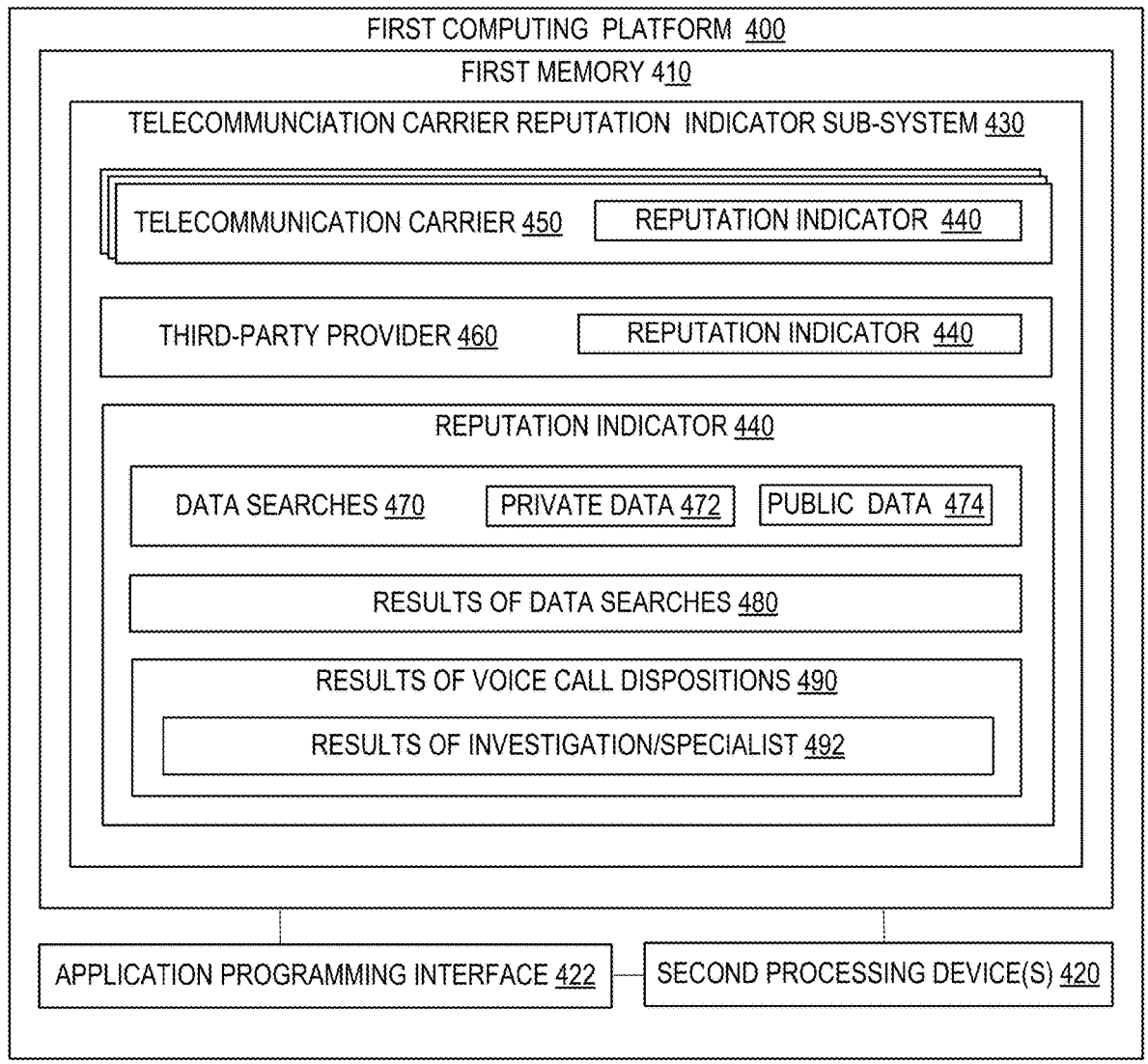
Figure 3:
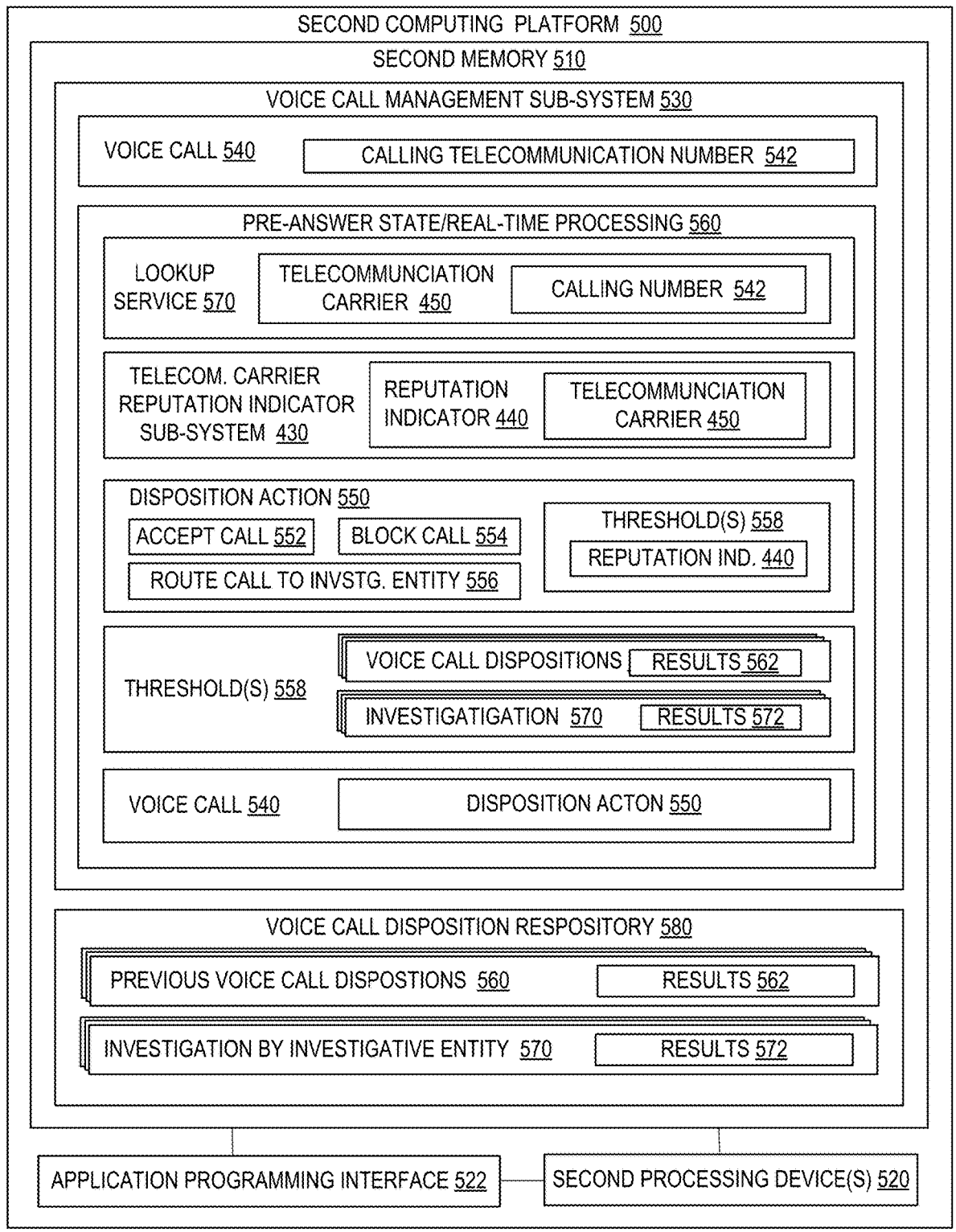
Figure 4:
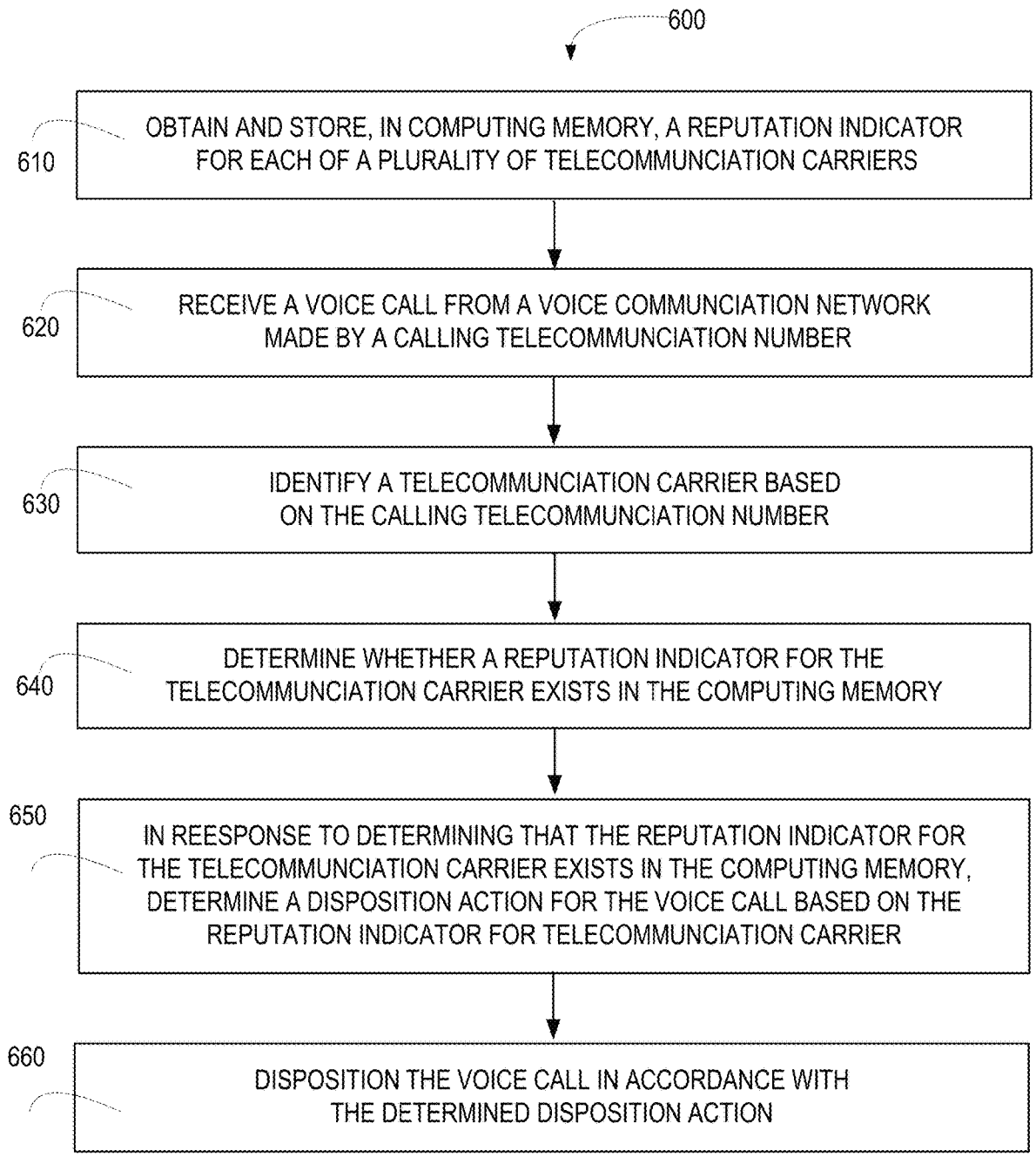

Having thus described embodiments of the invention in general terms, reference will now be made the accompanying drawings, wherein:

FIG. 1 is a schematic/block diagram of a system for voice communication network security, in accordance with embodiments of the present invention;

FIG. 2 is block diagram of a computing platform configured for obtaining/generating and storing reputation indicators for telecommunication carriers, in accordance with embodiments of the present invention;

FIG. 3 is block diagram of a computing platform configured for voice communication network security, in accordance with embodiments of the present invention; and FIG. 4 is a flow diagram of method for voice communication network security, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as Q SHARP (Q #), PYTHON, JAVA, PERL, SMALLTALK, C++, SPARK SQL, HADOOP HIVE or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for voice communication network defense security which allows for managing and/or preventing voice calls based on which telecommunication carrier provided the calling number. By managing voice calls based on the telecommunication carrier, as opposed to the telephone number, the present invention is able to address the situation in which would-be wrongdoers are in possession of a large volume of "throw away" numbers and account for the fact that many telecommunications carriers have poor reputations when it comes to providing these would-be wrongdoers with such a large volume of numbers.

Additionally, the security management provided by the present invention is implemented at the voice communication network perimeter, such that voice calls can be managed and/or prevented/block in real-time while the call is in a pre-answer state. As a result, the present invention provides the capability to prevent/block wrongdoers from accessing the intra-voice communication network or, at a minimum ensures that potential wrongdoers are properly vetted through an investigative process.

Specifically, the invention relies on determining or otherwise obtaining a repository of reputational indicators, otherwise referred to as scores or ratings, for each known telecommunication carrier. As voices calls are received the invention determines which telecommunication carrier is associated with the number and, in response to determining that a reputation indicator exists for the telecommunication carrier within the repository, determines a DISPOSITION action (e.g., accept, block, route to investigative entity) or the like based on the reputation indicator and, subsequently dispositions the call in accordance with the determined action. As a result, voice calls are managed and/or prevented based, not on the calling number, but rather on the reputation of the telecommunication carrier that issued the calling number.

Turning now to the figures, FIG. 1 illustrates a system 100 for voice communication network defense, in accordance with embodiments of the present invention. The system is implemented in a voice communciation network 200 that may comprise wired or wireless networks, including, but not limited to, the Internet, cellular networks, public switched telephone networks (PSTN) or the like. The voice communciation network 200 provides for various voice network apparatus 210, such as mobile communciation apparatus 210-1, landline communciation apparatus 210-2 and the like to communicate over the voice communciation network 200 (i.e., receive and place voice calls).

The system 100 of the present invention manages voices calls from the voice communciation network 200, which are attempting to access an intra-voice network communciation network 300. The intra-voice network communciation network 300 is associated with an entity, such as a public or private enterprise, business or the like. In specific embodiments of the invention, intra-voice network communciation network 300 is associated with an entity which is in possession of user personal data, such that, in conventional course of operation, user personal data may be communciated to a calling party during a voice call upon proper user authentication.

System 100 includes first computing platform 400, which may comprise a database server or the like. First computing platform 400 includes first memory 410 and at least one first processing device 420 in communication with the first memory 410. First memory 410 stores telecommunication carrier reputation indicator sub-system 430 that is executable by the first processing device(s) 420. Telecommunication carrier reputation indicator sub-system 430 is configured to obtain and store, in memory 410, a reputation indicator 440 for each of a plurality of telecommunication carriers 450. The reputation indicator 460, which may be a numeric score, rating or the like, indicates the reputation that the associated telecommunication carrier has acquired for providing services (i.e., accounts/numbers) to wrongdoers (i.e., individual/entities who place voice calls for purposes of impersonating an actual user and attempting to wrongfully acquire the personal information of actual user).

System 100 additionally includes second computing platform 500, which may comprise an application server or the like. Second computing platform 500 is situated at the perimeter of inter-voice communication network 300, such that, second computing platform 500 acts as a firewall to manage voice calls received from voice communication network 200. Second computing platform 500 includes second memory 510 and at least one second processing device 520 in communication with the second memory 510. Second memory 410 stores voice call management sub-system 530 that is executable by second processing device(s) 520 and configured to manage voice calls received from voice communication network 200.

As a means of managing voice calls, voice call management sub-system 530 is configured to receive a voice call 540 from the voice communication network 200 being made by a calling telecommunication number 542 (i.e., the calling telephone number). While the voice call 540 is in a pre-answer state, voice call management sub-system 530 is configured to manage, in real-time, disposition of the voice call 540. Specifically, voice call management sub-system 530 is configured to identify a telecommunication carrier 450 associated with the calling telecommunication number 542 and, in response to identifying the telecommunication carrier 450, access the telecommunication carrier reputation indicator sub-system 430 to determine whether a reputation indicator 440 exists therein for the telecommunication carrier 450. In response to determining that a reputation indicator 440 for the telecommunication carrier 450 does exist in the telecommunication carrier reputation indicator sub-system 430, voice call management sub-system 530 is further configured to determine a disposition action 550 for the voice call 540 based on the reputation indicator 460. The disposition action 550 may include, but is not necessarily limited to, accepting the voice call, blocking/rejecting the voice call, and routing the voice call to an investigative entity, otherwise referred to as a specialist. The investigative entity is an individual specially trained to detect whether the calling party is a wrongdoer (i.e., someone impersonating an actual user with the intent on acquiring personal data of the actual user or the like). In response to determining the disposition action, voice call management sub-system 530 is further configured to disposition the voice call 540 in accordance with the determined disposition action 550.

Referring to FIG. 2, a block diagram is depicted of first computing platform 400, highlighting various alternate embodiments of the present invention. First computing platform 400 which may comprise one or more devices (e.g., memory units, database servers or the like) is configured to execute software programs, including engines, instructions, algorithms, modules, routines, applications, tools, and the like. It should be noted that any and all of the functionality of first computing platform 400 may be included within second computing platform 500 (shown in FIG. 1). In those embodiments of the invention, in which all of the functionality of first computing platform 400 is included in second computing platform 500 (i.e., the telecommunication carrier reputation indicator sub-system 430 is included in second computing platform 500), the need for separate computing platforms is obviated.

First computing platform 400 includes first memory 410 and the like which may comprise volatile and non-volatile memory, such as read-only and/or random-access memory (RAM and ROM), EPROM, EEPROM, flash cards, or any memory common to computing platforms). Moreover, first memory 410 and the like may comprise cloud storage, such as provided by a cloud storage service and/or a cloud connection service.

Further, first computing platform 400 also includes one or more first processing devices 420, which may be an application-specific integrated circuit ("ASIC"), or other chipset, logic circuit, or other data processing device configured to execute stored software/firmware including telecommunication carrier reputation indicator sub-system 430 or the like. First processing device(s) 420 or the like may execute one or more application programming interface (APIs) 422 that interface with any resident programs, such as telecommunication carrier reputation indicator sub-system 430 or the like stored in first memory 410 of the first computing platform 400 and any external programs. First processing device(s) 420 may include various processing subsystems (not shown in FIG. 2) embodied in hardware, firmware, software, and combinations thereof, that enable the functionality of first computing platform 400 and the operability of first computing platform 400 on a distributed communications network. For example, processing subsystems allow for initiating and maintaining communications and exchanging data with other networked devices, such as second computing platform 500 (shown in FIG. 1). For the disclosed aspects, processing subsystems of first computing platform 400 may include any processing subsystem used in conjunction with telecommunication carrier reputation indicator sub-system 430 and related engines, tools, applications, routines, sub-routines, algorithms, sub-algorithms, sub-modules thereof.

First computing platform 400 additionally includes a communications module (not shown in FIG. 2) embodied in hardware, firmware, software, and combinations thereof, that enables electronic communications between first computing platform 400 and other network devices, such as, but not limited to, second computing platform 500. Thus, communication module may include the requisite hardware, firmware, software and/or combinations thereof for establishing and maintaining a network communication connection with one or more network devices.

First memory 410 stores telecommunication carrier reputation indicator sub-system 430, which, as described in relation to FIG. 1, is configured to obtain and store, in first memory 410, a reputation indicator 440, such as a score, rating or the like, for each telecommunication carrier 450. It should be noted that reputation indicators 440 will change, over-time, as more is known about emerging telecommunication carriers 450 and as telecommunication carriers 450 evolve over time. In specific embodiments of the invention the reputation indicators 440 are obtained from a third-party provider 460. In such embodiments of the invention, the reputation indicators may be obtained/updated and stored in first memory 410 on a predetermined schedule (e.g., daily, weekly, monthly or the like). In other embodiments of the system 100, the reputation indicators 440 may be obtained from the third-party provider 460 on-demand or dynamically obtained in conjunction with receipt of a voice call.

In other specific embodiments of the invention, the telecommunication carrier reputation indicator sub-system 430 is configured to obtain/generate the reputation indicators 440 itself. In such embodiments of the invention, the telecommunication carrier reputation indicator sub-system 430 is configured to conduct data searches 470 (e.g., big data searches or the like) of one or more of private sector data sources 472 (e.g., internal data sources) and/or public sector data sources 474 (e.g., government agencies, such as Federal Communication Commission (FCC), Federal Trade Commission (FTC) or the like) to obtain data that is relevant to the reputation of telecommunication carriers 450. In response to conducting the data searches 470, the telecommunication carrier reputation indicator sub-system 430 may be configured to utilize one or more algorithms, including artificial intelligence/machine-learning algorithms, to determine reputation indicators 440 for each known telecommunication carrier 450. In such embodiments of the invention, the algorithms may rely on results 480 of the data searches 470 and results 490 of voice call dispositions from the voice call management sub-system 530 (e.g., volume of calls from a specific telecommunication carrier 450 and the like) to determine the reputation indicators 440. In specific embodiments of the system, the algorithms may rely on results 492 from the investigative entity (i.e., voice calls that are routed to an investigative entity for heightened analysis) to determine the reputation indicators. In this regard, by implementing results 490 of voice call dispositions and/or results 492 from the investigative entity, telecommunication carrier reputation indicator sub-system 430 may be configured to constantly/dynamically refine/update the reputation indicators 440 based on current results 490, 492.

Referring to FIG. 3, a block diagram is depicted of second computing platform 500, highlighting various alternate embodiments of the present invention. Second computing platform 500 which may comprise one or more devices (e.g., one or more application servers or the like) is configured to execute software programs, including engines, instructions, algorithms, modules, routines, applications, tools, and the like.

Similar to first memory 410, second memory 520 may comprise volatile and non-volatile memory, such as read-only and/or random-access memory (RAM and ROM), EPROM, EEPROM, flash cards, or any memory common to computing platforms). Moreover, second memory 510 and the like may comprise cloud storage, such as provided by a cloud storage service and/or a cloud connection service. Similar to first processing device(s) 420, second processing device(s) 520 may be an application-specific integrated circuit ("ASIC"), or other chipset, logic circuit, or other data processing device. Second processing device(s) are configured to execute stored software/firmware including voice call management sub-system 530 or the like. Second processing device(s) 520 or the like may execute one or more application programming interface (APIs) 522 that interface with any resident programs, such as voice call management sub-system 530 or the like stored in second memory 510 and any external programs. Further, second processing device(s) 520 may include various processing subsystems (not shown in FIG. 3) embodied in hardware, firmware, software, and combinations thereof, that enable the functionality of second computing platform 500 and the operability thereof on a distributed communications network. For example, processing subsystems allow for initiating and maintaining communications and exchanging data with other networked devices, such as first computing platform 400 (shown in FIG. 1). For the disclosed aspects, processing subsystems of second computing platform 500 may include any processing subsystem used in conjunction with voice call management sub-system 530 and related engines, tools, applications, routines, sub-routines, algorithms, sub-algorithms, sub-modules thereof.

Second computing platform 500 additionally includes a communications module (not shown in FIG. 3) embodied in hardware, firmware, software, and combinations thereof, that enables electronic communications between second computing platform 500 and other network devices, such as, but not limited to, first computing platform 400. Thus, communication module may include the requisite hardware, firmware, software and/or combinations thereof for establishing and maintaining a network communication connection with one or more network devices.

Second memory 510 stores voice call management sub-system 530, which, as described in relation to FIG. 1, is configured to receive a voice call 540 from the voice communication network 200 being made by a calling telecommunication number 542 (i.e., the calling telephone number). As such the voice call 540 may be received from any voice communication channel including, but not limited to, a cellular network, a PSTN, the Internet (e.g., Voice Over IP (VOIP) or the like) or the like.

While the received voice call 540 is in the pre-answer state 560, voice call management sub-system 530 is configured to manage, in real-time, disposition of the voice call 540. Such real-time management/disposition includes identifying a telecommunication carrier 450 associated with the calling telecommunication number 542. In specific embodiments of the invention, the telecommunication carrier 450 is identified by accessing a lookup service 570 that associates telephone numbers with the issuing telecommunication carrier. The lookup service 570 is typically an external service that requires the voice call management sub-system 530 to communicate with a distributed communication network, such as the Internet or the like.

In response to identifying the telecommunication carrier 450, the telecommunication carrier reputation indicator sub-system 430 is accessed to determine whether a reputation indicator 440 exists therein for the identified telecommunication carrier 450. As discussed in relation to FIGS. 1 and 2, the reputation indicator may comprise a score or rating for the telecommunication carrier that indicates the likelihood that the carrier is willing to provide users with an uncharacteristically large volume of telecommunication (i.e., telephone) numbers or otherwise willing to ignore that the user may use the services to the detriment of the calling party. In certain instances, new-emerging telecommunication carriers may not have a reputation indicator stored within sub-system 430. In specific embodiments of the invention, if a determination is made that no reputation indicator 440 exists in sub-system 430 for the telecommunication carrier 450, the voice call may be routed to an investigative entity 556. The investigative entity is specially trained to perceive that the caller is or is suspected to be a wrongdoer (e.g., someone trying to acquire the personal information of another).

In response to determining that a reputation indicator 440 for the telecommunication carrier 450 does exist in the telecommunication carrier reputation indicator sub-system 430, voice call management sub-system 530 is further configured to determine a disposition action 550 for the voice call 540 based on the reputation indicator 460. The disposition action 550 may include, but is not necessarily limited to, accepting 552 the voice call 540, blocking/rejecting 554 the voice call 540 and routing 556 the voice call 540 to an investigative entity, otherwise referred to as a specialist.

In specific embodiments of the invention, the disposition action 550 is determined by comparing the reputation indicator 440 to one or more thresholds 558, each of the thresholds being associated with a specific disposition action 550. For example, a first threshold may be set for rejecting 554 the voice call 540 and a second threshold may be set for routing 556 the voice call 540 to an investigative entity. In such an example, when the reputation indicator 550 falls below the first threshold the voice call 540 is blocked/rejected; when the reputation indicator exceeds the first threshold but falls below the second threshold the voice call 540 is routed 556 to an investigative entity and when the reputation indicator exceeds both the first and second thresholds the voice call 540 is accepted 552.

In specific embodiments of the invention threshold(s) 558 may be set or adjusted, dynamically or otherwise, based on results 562 of previous voice call dispositions 560 and/or results 572 of the investigation 570 by the investigative entity (i.e., calls routed 556 to the investigative entity). Thus, second memory 510, or some other memory external from second computing platform 500, may additionally store a voice call disposition repository 580 that is configured to store results 562 of previous voice call dispositions 560 and/or results 572 of the investigation 570 by the investigative entity. In those embodiments of the invention, in which the threshold(s) are adjusted based on the results 562, 572 of historical voice call dispositions 560 and/or investigation 570 by the investigative entity, the adjusted by occur by implementing machine-learning techniques, so that the threshold(s) are fine-tuned, over time, to accurately manage voice calls.

In response to determining the disposition action 550, voice call management sub-system 530 is further configured to disposition the voice call 540 in accordance with the determined disposition action 550. In other words, in specific embodiments, the voice call 540 is either accepted 552, blocked 554 or routed 556 to the investigative entity.

Referring to FIG. 4, a flow diagram is depicted of a method 700 for voice communication network security defense, in accordance with embodiments of the present invention. At Event 610, a reputation indicator is obtained and stored for a plurality of telecommunication carriers. The reputation indicator may be a score or rating or some other indice that represent the reputation of the telecommunication carrier as it applies to interacting with suspect users/wrongdoers, such as supplying suspect users with a large quantity of telecommunication numbers. The reputation indicators may be obtained from one or more third-party services or the entity seeking voice network security may determine the reputation indicators on their own. For example, the entity may conduct private and public sector searches for data pertaining to telecommunication carriers and may implement one or more algorithms with the entity's own reputation criteria defined therein, to generate the reputation indicators. user credentials are received and stored in computing memory. The plurality of telecommunication carriers should comprise most, if not all, known telecommunication carriers. As new telecommunication carriers emerge and have achieved a reputation, they will be incorporated into the plurality of telecommunication carriers.

At Event 620, a voice call is received from a voice communication network made by a calling telecommunication number. The voice call may be received from any voice communication network including, but not limited to, a cellular network, PSTN, Internet (e.g., VOIP and the like) and the like.

In response to receiving the voice call and while the call is in a pre-answer state (i.e., so-called "ringing" state), the remainder of the events in the method occur in real-time or near real-time (i.e., while the call remains in the pre-answer state). At Event 630, a telecommunication carrier is identified based on the calling telecommunication number. In specific embodiments of the invention, a third-party lookup service is accessed, which associates telecommunication carriers with the numbers that they have assigned.

Once the telecommunication carrier has been identified, at Event 640, the reputation indicator storage is accessed to determine whether a reputation indicator exists in the storage for the identified telecommunication indicator. In response to determining that a reputation indicator does exist for the telecommunication carrier, at Event 650, a disposition action is determined for the voice call based on the reputation indicator of the telecommunication carrier. In specific embodiments of the method, the disposition action may include, but is not limited to, accepting the call, blocking/rejecting the call, routing the call to an investigative entity or the like. In specific embodiments of the invention, the disposition actions are determined by comparing the reputation indicator to one or more thresholds. For example, a first threshold may be set for blocking/rejecting the voice call and a second threshold may be set for routing the voice call to an investigative entity. In such an example, when the reputation indicator falls below the first threshold the voice call is blocked/rejected; when the reputation indicator exceeds the first threshold but falls below the second threshold the voice call is routed to an investigative entity and when the reputation indicator exceeds both the first and second thresholds the voice call is accepted. Once the disposition action has been determined, at Event 660, the voice call is dispositioned according to the determined disposition action.

It should be noted that in specific embodiments of the invention, the reputation indicators and/or thresholds may be changed/updated, over time and, in some instances dynamically changed/updated. In specific embodiments of the invention machine-learning techniques as used to analyze the results of previous voice call dispositions and/or results of investigations by investigative entities and determine changes/updates to the reputation indicators and/or thresholds.

As evident from the preceding description, the systems, methods and the like described herein represents an improvement in voice communication network security and, specifically, voice communication access security by providing for access management that is based on the telecommunication carrier providing the calling number, as opposed to the calling number itself. Specifically, by managing accessing based on the reputation of the telecommunication carriers the present invention circumvents the problems associated with security-casual carriers implementing suspect business practices, which allow wrongdoers the ability to acquire a multitude of "throw-away" numbers as a means of wrongfully acquiring the personal information of others or carrying out other nefarious actions.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for real-time network defense in a voice communication network, the system comprising:
a first computing platform including a first memory and at least one first processing device in communication with the first memory, wherein the first memory stores a telecommunication carrier reputation indicator subsystem, executable by the at least one first processing device and configured to:
obtain and store a reputation indicator for each of a plurality of telecommunication carriers;
a second computing platform including a second memory and at least one second processing device in communication with the second memory, wherein the second memory stores a voice call management subsystem, executable by the at least one second processing device and configured to:
receive a voice call from a calling telecommunication number,
in real-time while the voice call is in a pre-answer state:
identify a telecommunication carrier based on the calling telecommunication number,
determine whether a reputation indicator for the telecommunication carrier exists in the telecommunication carrier reputation indicator sub-system,
in response to determining that the reputation indicator for the telecommunication carrier does not exist in the telecommunication carrier reputation indicator sub-system, route the voice call to an internal investigative specialist who is an individual trained in detecting whether a live-person calling party is a wrongdoer, and
in response to determining that the reputation indicator for the telecommunication carrier exists in the telecommunication carrier reputation indicator sub-system, determine a disposition action, from amongst a plurality of disposition actions, for the voice call based on the reputation indicator for the telecommunication carrier, and disposition the voice call in accordance with the determined disposition action, wherein the plurality of disposition actions include (i) accepting the voice call, (ii) blocking the voice call, and (iii) routing the voice call to the internal investigative specialist who the individual trained in detecting whether the live-person calling party is a wrongdoer.

2. The system of claim 1, wherein the voice call management subsystem is further configured to determine the disposition action for the voice call by comparing the reputation indicator of the telecommunication carrier to one or more thresholds, wherein the one or more thresholds are each associated with one of (i) accepting the voice call, (ii) blocking the voice call, and (iii) routing the voice call to an investigative entity.

3. The system of claim 2, wherein the voice call management subsystem is further configured to store, in a voice call disposition repository, at least one of (i) the disposition action for the voice call, and (ii) a result of routing the voice call to the investigative entity.

4. The system of claim 3, wherein the voice call management subsystem is further configured to:
implement machine-learning techniques to set values for the one or more thresholds based at least on one or more of (i) disposition actions of previous voice call and (ii) results of routing previous calls to the investigative entity.

5. The system of claim 1, wherein the voice call management subsystem is further configured to identify the telecommunication carrier based on the calling telecommunication number by accessing a lookup service that matches telecommunication numbers to telecommunication carriers.

6. The system of claim 1, wherein the telecommunication carrier reputation indicator sub-system is further configured to determine the reputation indicator for the plurality of telecommunication carriers by conducting at least one of public sector data searches and private sector data searches to acquire data indicative of the telecommunication carriers' reputation for assigning telecommunication numbers to wrongdoers.

7. The system of claim 6, wherein the telecommunication carrier reputation indicator sub-system is further configured to determine the reputation indicator for the plurality of telecommunication carriers based on (i) the data indicative of the telecommunication carriers' reputation for assigning telecommunication numbers to wrongdoers, and (ii) data associated with results of previously dispositioned voice calls.

8. A computer-implemented method for real-time network defense in a voice communication network, the method implemented by one or more computing processor devices and comprising:
  obtaining and storing, in computing memory, a reputation indicator for each of a plurality of telecommunication carriers;
  receiving a voice call from a calling telecommunication number,
  in real-time while the voice call is in a pre-answer state:
    identifying a telecommunication carrier based on the calling telecommunication number;
    determining whether a reputation indicator for the telecommunication carrier exists in the computing memory;
    in response to determining that the reputation indicator for the telecommunication carrier does not exist in the telecommunication carrier reputation indicator sub-system, route the voice call to an internal investigative specialist who is an individual trained in detecting whether a live-person calling party is a wrongdoer; and
    in response to determining that the reputation indicator for the telecommunication carrier exists in the computing memory, determining a disposition action, from amongst a plurality of disposition actions, for the voice call based on the reputation indicator for the telecommunication carrier, and dispositioning the voice call in accordance with the determined disposition action, wherein the plurality of disposition actions include (i) accepting the voice call, (ii) blocking the voice call, and (iii) routing the voice call to the internal investigative specialist who the individual trained in detecting whether the live-person calling party is a wrongdoer.

9. The computer-implemented method of claim 8, wherein determining the disposition action for the voice call further comprises comparing the reputation indicator of the telecommunication carrier to one or more thresholds, wherein the one or more thresholds are each associated with one of (i) accepting the voice call, (ii) blocking the voice call, and (iii) routing the voice call to an investigative entity.

10. The computer-implemented method of claim 8, further comprising storing, in a voice call disposition repository, at least one of (i) the disposition action for the voice call, and (ii) a result of routing the voice call to the investigative entity.

11. The computer-implemented method of claim 10, further comprising implementing machine-learning techniques to set values for the one or more thresholds one or more of (i) disposition actions of previous voice call and (ii) results of routing previous calls to the investigative entity.

12. A computer program product including a non-transitory computer-readable medium that comprises:
  a first set of codes for causing a computer to obtain and store, in computing memory, a reputation indicator for each of a plurality of telecommunication carriers; and
  a second set of codes for causing a computer to, in response to receiving a voice call from a calling telecommunication number and in real-time while the voice call is in a pre-answer state (i) identify a telecommunication carrier based on the calling telecommunication number, (ii) determine whether a reputation indicator for the telecommunication carrier exists in the computing memory, (iii) in response to determining that the reputation indicator for the telecommunication carrier does not exist in the computing memory, route the voice call to an internal investigative specialist who is an individual trained in detecting whether a live-person calling party is a wrongdoer, (iv) in response to determining that the reputation indicator for the telecommunication carrier exists in the computing memory, determine a disposition action, from amongst a plurality of disposition actions, for the voice call based on the reputation indicator for the telecommunication carrier, and disposition the voice call in accordance with the determined disposition action, wherein the plurality of disposition actions include (i) accepting the voice call, (ii) blocking the voice call, and (iii) routing the voice call to the internal investigative specialist who the individual trained in detecting whether the live-person calling party is a wrongdoer.

13. The computer program product of claim 12, wherein the second set of codes are further configured to cause the computer to (iv) determine the disposition action for the voice call further by comparing the reputation indicator of the telecommunication carrier to one or more thresholds, wherein the one or more thresholds are each associated with one of (a) accepting the voice call, (b) blocking the voice call, and (c) routing the voice call to an investigative entity.

14. The computer program product of claim 12, further comprising a third set of codes for causing a computer to store, in a voice call disposition repository, at least one of (i) the disposition action for the voice call, and (ii) a result of routing the voice call to the investigative entity.

* * * * *